(12) United States Patent
Gohmann

(10) Patent No.: US 8,740,497 B2
(45) Date of Patent: Jun. 3, 2014

(54) ROADWAY ARRANGEMENT FOR POWER GENERATION

(76) Inventor: John L. Gohmann, Lexington, KY (US)

( * ) Notice: Subject to any disclaimer, the term of this patent is extended or adjusted under 35 U.S.C. 154(b) by 505 days.

(21) Appl. No.: 13/236,891

(22) Filed: Sep. 20, 2011

(65) Prior Publication Data

US 2012/0068473 A1    Mar. 22, 2012

Related U.S. Application Data

(60) Provisional application No. 61/385,182, filed on Sep. 22, 2010.

(51) Int. Cl.
*E01C 7/00* (2006.01)
*F03G 3/02* (2006.01)
*E01D 19/12* (2006.01)

(52) U.S. Cl.
CPC . *F03G 3/02* (2013.01); *E01D 19/12* (2013.01)
USPC .................................................. 404/71; 14/78

(58) Field of Classification Search
CPC .................................... F03G 3/02; E01D 19/12
USPC .................................................. 404/71; 14/78
See application file for complete search history.

(56) References Cited

U.S. PATENT DOCUMENTS

| | | | | |
|---|---|---|---|---|
| 4,212,598 A | * | 7/1980 | Roche et al. | 417/229 |
| 4,238,687 A | * | 12/1980 | Martinez | 290/1 R |
| 5,355,674 A | * | 10/1994 | Rosenberg | 60/325 |
| 5,634,774 A | * | 6/1997 | Angel et al. | 417/229 |
| 6,204,568 B1 | * | 3/2001 | Runner | 290/1 R |
| 6,376,925 B1 | * | 4/2002 | Galich | 290/1 R |
| 7,067,932 B1 | * | 6/2006 | Ghassemi | 290/1 R |
| 7,145,257 B2 | | 12/2006 | Ricketts | |
| 7,371,030 B2 | * | 5/2008 | Hickman | 404/71 |
| 7,541,684 B1 | * | 6/2009 | Valentino | 290/1 R |
| 2005/0127677 A1 | | 6/2005 | Luttrull | |
| 2007/0264081 A1 | * | 11/2007 | Chiu | 404/71 |
| 2009/0315334 A1 | * | 12/2009 | Chen | 290/1 A |

FOREIGN PATENT DOCUMENTS

| | | |
|---|---|---|
| JP | 3138897 U9 | 12/2007 |
| KR | 10-2007-0028972 A | 3/2007 |
| KR | 10-2009-0106984 A | 10/2009 |
| KR | 10-2010-0060633 A | 6/2010 |

OTHER PUBLICATIONS

ISA/KR, International Search Report and Written Opinion issued in corresponding International Application No. PCT/US2011/052280, completed Apr. 24, 2012.

* cited by examiner

*Primary Examiner* — Raymond W Addie
(74) *Attorney, Agent, or Firm* — Stites & Harbison, PLLC; David W. Nagle, Jr.

(57) ABSTRACT

A roadway arrangement comprises a first road segment; an upper bridge mounted for rotational movement about a pivot axis relative to the first road segment; a lower bridge, including one or more upwardly extending segments; and a second road segment. As a vehicle travels from the first road segment and starts moving across the upper bridge, the upper bridge will rotate downward about the pivot axis and will continue to rotate until the one or more upwardly extending segments of the lower bridge extend through respective openings defined by the upper bridge, at which time the vehicle will transition from driving on the road surface as defined by the upper bridge to driving on the road surface as defined by the upwardly extending segments of the lower bridge. The movement of the upper bridge produces work, which can then be used for power generation.

11 Claims, 4 Drawing Sheets

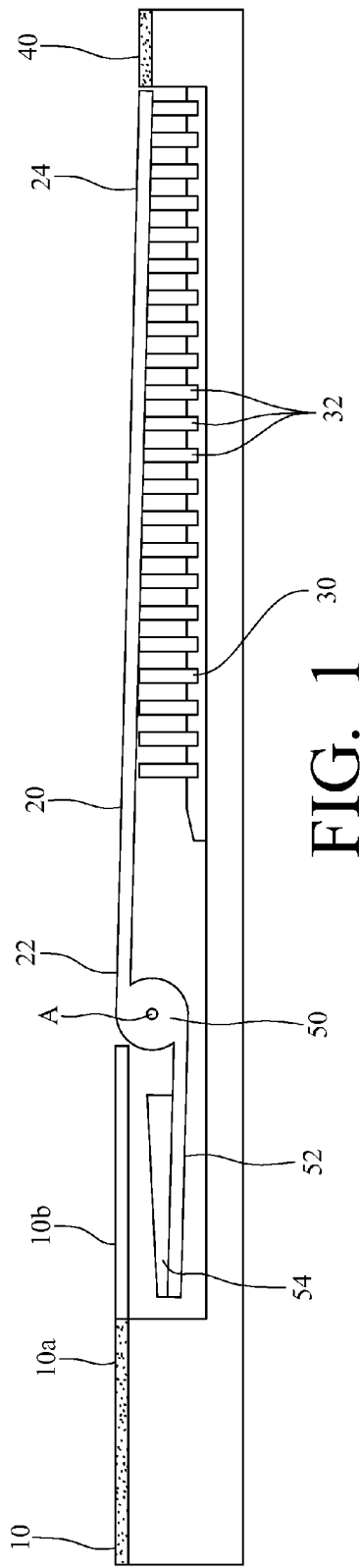
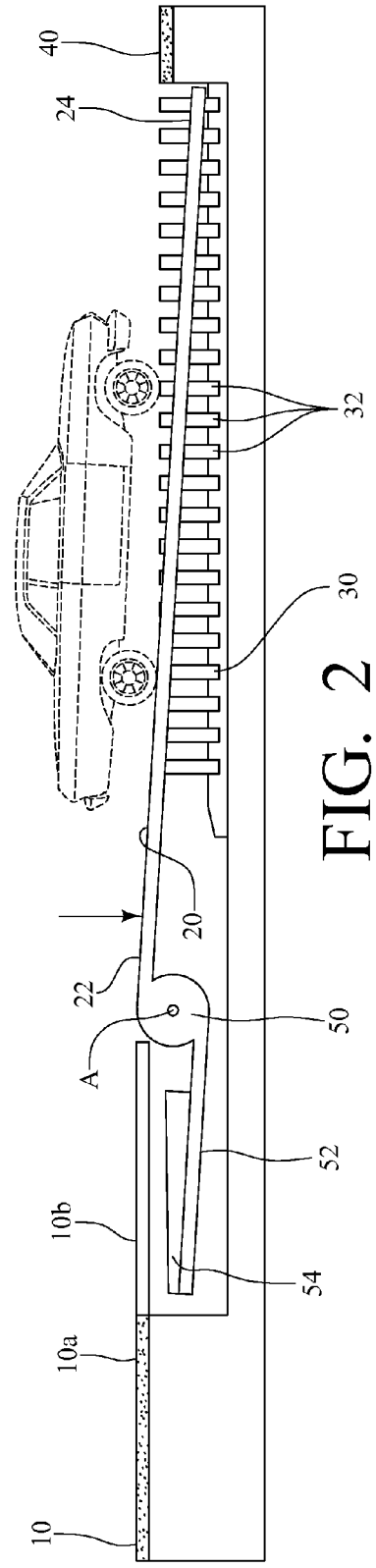
FIG. 1
FIG. 2

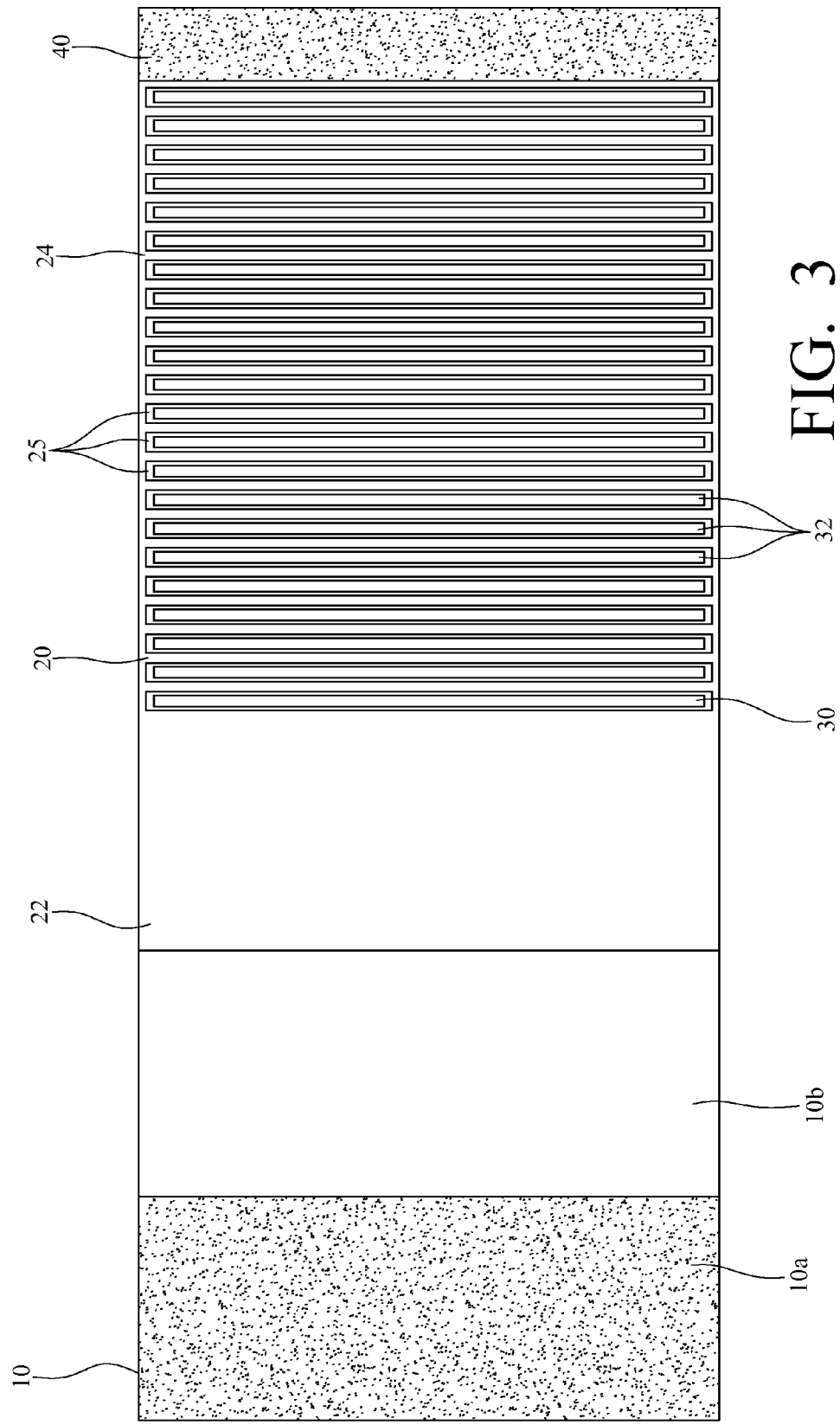

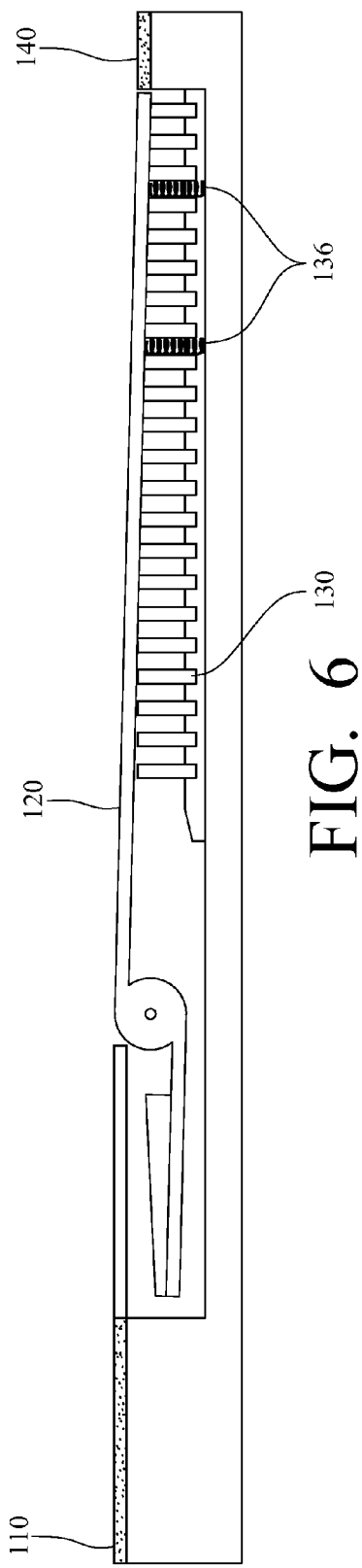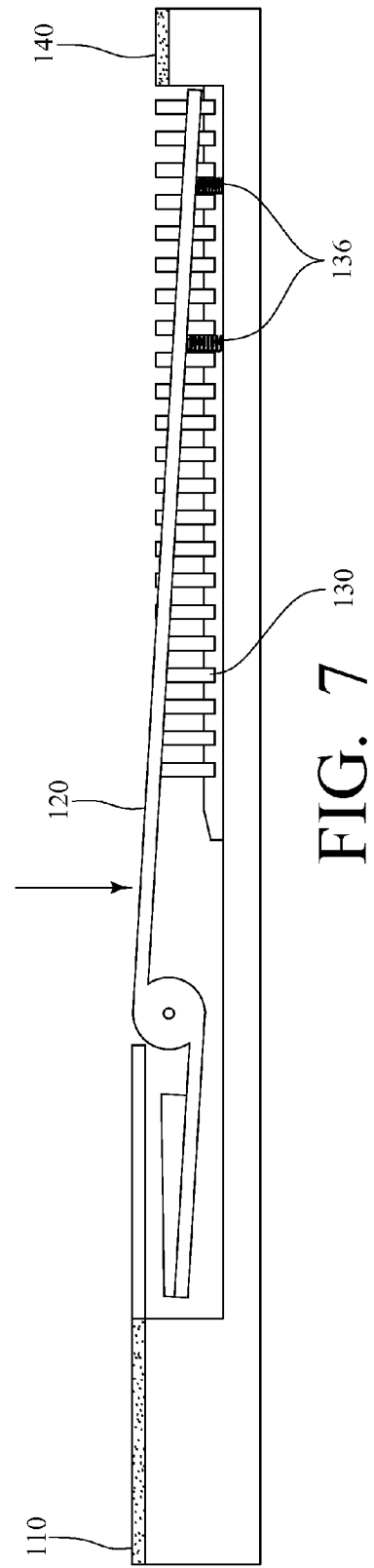

ROADWAY ARRANGEMENT FOR POWER GENERATION

CROSS-REFERENCE TO RELATED APPLICATIONS

The present application claims priority to U.S. Provisional Patent Application Ser. No. 61/385,182 filed on Sep. 22, 2010, the entire disclosure of which is incorporated herein by reference.

BACKGROUND OF THE INVENTION

The present invention relates to a roadway arrangement that provides for power generation. On many roadways, there is a consistent traffic flow, with multiple vehicles traveling over the road surface at almost all times. Each vehicle represents a significant amount of potential energy. Accordingly, there have been efforts to capture some of that potential energy and convert it to electric power or another usable form.

SUMMARY OF THE INVENTION

The present invention is a roadway arrangement for power generation, and, more particularly, a roadway arrangement in which the weight of vehicles traveling over the road surface is used to produce work, which is then used for power generation.

An exemplary roadway arrangement in accordance with the present invention includes a first road segment, an upper bridge, a lower bridge, and a second road segment. The upper bridge and the lower bridge cooperate to span the distance between the first road segment and the second road segment, and the upper bridge and the lower bridge further cooperate to provide the road surface between the first road segment and the second road segment.

The upper bridge is mounted for rotational movement about a pivot axis near the end of the first road segment. The upper bridge defines a plurality of openings therethrough near its opposite end. In one exemplary embodiment, the openings are elongated slots, each slot having a longitudinal axis that is perpendicular to a direction of travel for vehicles traveling over the road surface. However, other shapes and/or patterns of openings are also possible.

The lower bridge is comprised of multiple beams or similar upwardly extending segments. These beams are positioned below the upper bridge, but as the upper bridge rotates about the pivot axis into a lowered (or compressed) position, each of the beams is configured to pass through a respective opening defined by the upper bridge. In other words, at least a portion of the upper bridge can be characterized as a "grate" that fits over and around the beams of the lower bridge. Thus, as the upper bridge rotates into a lowered (or compressed) position, the beams of the lower bridge effectively take over and define the road surface.

In practice, as a vehicle travels from the first road segment and starts moving across the upper bridge, the upper bridge will start to rotate downward about the pivot axis. As the vehicle moves further away from the first end of the upper bridge, such rotation will continue until the beams of the lower bridge extend through the respective openings defined by the upper bridge. The vehicle will thus transition from driving on the road surface defined by the upper bridge to driving on the road surface defined by the beams of the lower bridge. In the meantime, the movement of the upper bridge from the static position to the compressed position produces work, which can then be used for power generation.

For example, the movement of the upper bridge could be used to generate electric power through electromagnetic induction.

For another example, the movement of the upper bridge could be translated by some form of mechanical linkage and/or gearing arrangement into a rotational movement for an electric power generator.

For another example, the movement of the upper bridge could be used to apply a mechanical strain to piezoelectric materials, such as certain crystals or ceramics, for power generation.

As an additional refinement, spring and/or shock absorption elements could be also arrayed around a portion of the periphery of the lower bridge that act to return the upper bridge to its raised (or static) position.

DESCRIPTION OF THE DRAWINGS

FIG. 1 is a side view of an exemplary road arrangement made in accordance with the present invention, with the upper bridge in a raised (or static) position;

FIG. 2 is a side view of the exemplary road arrangement of FIG. 1, but with the upper bridge in a lowered (or compressed) position;

FIG. 3 is a top view of the exemplary road arrangement of FIG. 1;

FIG. 6 is a side view of another exemplary road arrangement made in accordance with the present invention, with the upper bridge in a raised (or static) position; and FIG. 7 is a side view of the exemplary road arrangement of FIG. 6, but with the upper bridge in a lowered (or compressed) position.

DETAILED DESCRIPTION OF THE INVENTION

Figure 5:
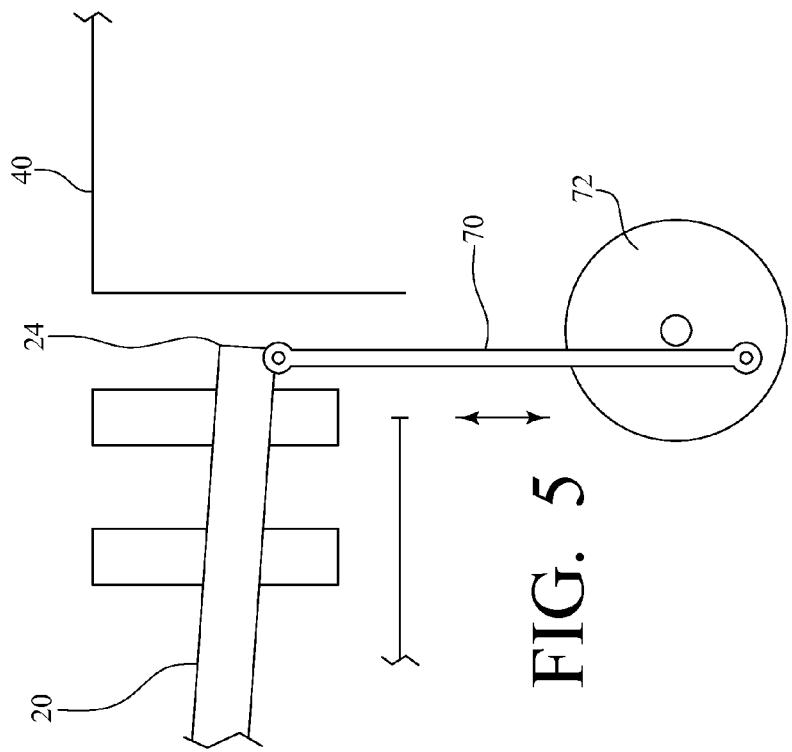
FIG. 5 is an enlarged view of the end of the upper bridge in the exemplary road arrangement of FIG. 1, wherein, as the upper bridge moves up and down, a linkage drives a wheel for electric power generation.

The present invention is a roadway arrangement for power generation, and, more particularly, a roadway arrangement in which the weight of vehicles traveling over the road surface is used to produce work, which is then used for power generation.

Referring now to FIGS. 1-3, an exemplary roadway arrangement in accordance with the present invention includes a first road segment 10, an upper bridge 20, a lower bridge 30, and a second road segment 40. The upper bridge 20 and the lower bridge 30 cooperate to span the distance between the first road segment 10 and the second road segment 40, and the upper bridge 20 and the lower bridge 30 further cooperate to provide the road surface between the first road segment 10 and the second road segment 40.

Referring still to FIGS. 1-3, in this exemplary embodiment, the first road segment 10 is collectively formed by an existing road segment 10a and a plate 10b that extends from the edge of the existing road segment 10a, the importance of which is further described below. The upper bridge 20 is in the form of a panel which is mounted for rotational movement about a pivot axis (A) near the end of the first road segment 10. For instance, in this exemplary embodiment, the upper bridge 20 is mounted to and extends from a drum 50. The drum 50 rotates about the pivot axis (A), thus raising or lowering the upper bridge 20, as is further described below. Also, in this exemplary embodiment, a panel 52 supporting a counterweight 54 is mounted to the drum 50 opposite the upper bridge 20. The panel 52 and the counterweight 54 are positioned below the plate 10b of the first road segment 10. The counterweight 54 maintains and returns the upper bridge 20 to a raised (or static) position when no vehicles are traveling over the road surface.

As an alternative, rather than using a drum 50 as described above, the upper bridge 20 could be operably connected to the first road segment 10 with a hinge, thus facilitating the rotational movement of the upper bridge 20 relative to the first road segment 10.

Referring still to FIGS. 1-3, the upper bridge 20 defines a plurality of openings 25 therethrough near its opposite end 24. In this exemplary embodiment, the openings 25 are elongated slots, each slot having a longitudinal axis that is perpendicular to a direction of travel for vehicles traveling over the road surface. However, other shapes and/or patterns of openings are possible without departing from the spirit and scope of the present invention.

As also shown in FIGS. 1-3, the lower bridge 30 is comprised of multiple beams 32 or similar upwardly extending segments. These beams 32 are positioned below the upper bridge 20, but as the upper bridge 20 rotates about the pivot axis (A) into a lowered (or compressed) position, as is further described below, each of the beams 32 is configured to pass through a respective opening 25 defined by the upper bridge 20. In other words, at least a portion of the upper bridge 20 can be characterized as a "grate" that fits over and around the beams 32 of the lower bridge 30. Thus, as the upper bridge 20 rotates into a lowered (or compressed) position, the beams 32 of the lower bridge 30 effectively take over and define the road surface.

Referring still to FIGS. 1-3, as mentioned above, in this exemplary embodiment, the openings are elongated slots, each slot having a longitudinal axis that is perpendicular to a direction of travel for vehicles traveling over the road surface. Furthermore, although a wide variety of dimensions and spacing could be used, in at least some exemplary embodiments, the beams 32 are each approximately 1-2 inches wide and spaced at intervals of 2-3.5 inches.

In practice, as a vehicle travels from the first road segment 10 and starts moving across the upper bridge 20, the upper bridge 20 will start to rotate downward about the pivot axis (A). As the vehicle moves further away from the first end 22 of the upper bridge 20, such rotation will continue until the beams 32 of the lower bridge 30 extend through the respective openings 25 defined by the upper bridge 20. The vehicle will thus transition from driving on the road surface defined by the upper bridge 20 to driving on the road surface defined by the beams 32 of the lower bridge 30. In the meantime, the movement of the upper bridge 20 from the static position to the compressed position produces work, which can then be used for power generation.

Figure 4:
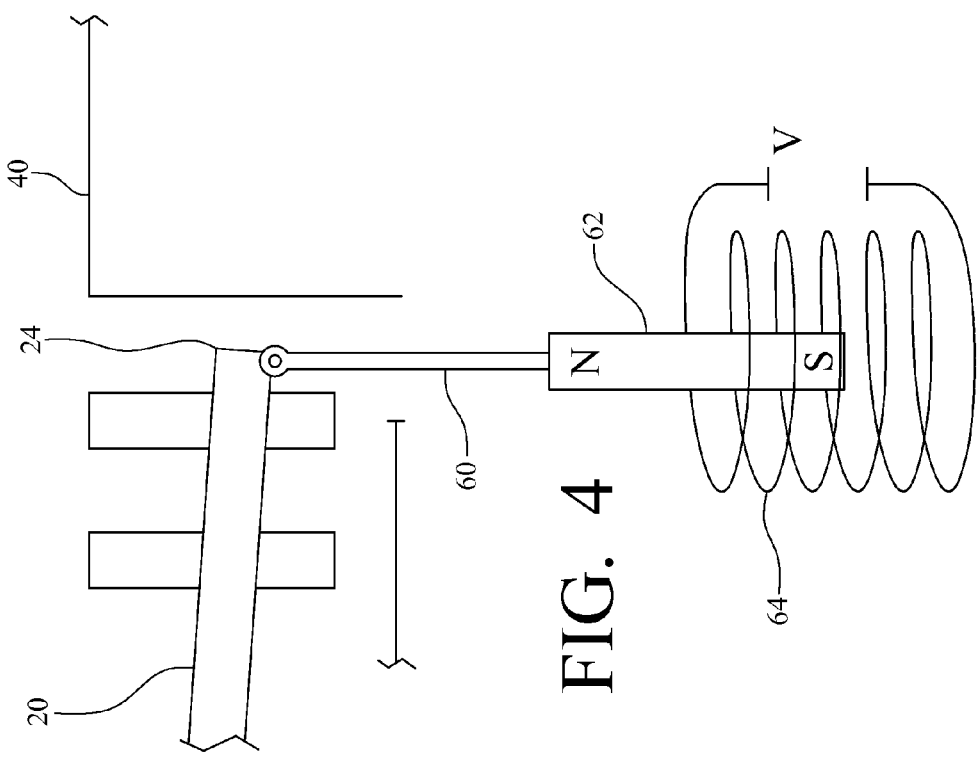
FIG. 4 is an enlarged view of the end of the upper bridge in the exemplary road arrangement of FIG. 1, wherein, as the upper bridge moves up and down, a magnet moves relative to a coil.

For example, the movement of the upper bridge 20 could be used to generate electric power through electromagnetic induction. In one exemplary embodiment, and as illustrated in the enlarged view of FIG. 4, a rod 60 is secured to the end 24 of the upper bridge 20. A magnet 62 is then secured to a distal end of the rod 60. As the upper bridge 20 moves up and down, the magnet 62 moves relative to a coil 64, which generates a voltage, which can then be used as a power source.

For another example, the movement of the upper bridge 20 could be translated by some form of mechanical linkage and/or gearing arrangement into a rotational movement for an electric power generator. In one exemplary embodiment, and as illustrated in the enlarged view of FIG. 5, a linkage 70 is pivotally secured at one end to the end 24 of the upper bridge 20 and is pivotally secured at the opposite end to a wheel 72. As the upper bridge 20 moves up and down, the linkage 70 drives the wheel 72, which can then be used for electric power generation. For instance, the wheel 72 may directly or indirectly rotate a set of conductors (not shown) through a stationary magnetic field to generate a current.

For another example, the movement of the upper bridge 20 could be used to apply a mechanical strain to piezoelectric materials, such as certain crystals or ceramics, for power generation.

Of course, the above are but a few examples of how to use the movement of the upper bridge 20 to generate power, and it is contemplated that various other means, mechanisms, or systems could be employed to use the movement of the upper bridge 20 to generate power without departing from the spirit and scope of the present invention.

Referring now to FIGS. 6-7, another exemplary roadway arrangement in accordance with the present invention again includes a first road segment 110, an upper bridge 120, a lower bridge 130, and a second road segment 140 that operate in the same manner as described above with reference to FIGS. 1-3. In this exemplary roadway arrangement, however, as a further refinement, there are spring and/or shock absorption elements 136 arrayed around a portion of the periphery of the lower bridge 130 that act to return the upper bridge 120 to its raised (or static) position.

One of ordinary skill in the art will also recognize that additional embodiments and implementations are possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A roadway arrangement, comprising:
    a first road segment;
    an upper bridge mounted for rotational movement about a pivot axis relative to the first road segment, said upper bridge defining a plurality of openings therethrough;
    a lower bridge, including one or more upwardly extending segments, each of which is configured to pass through a respective opening defined by the upper bridge; and
    a second road segment, wherein the upper bridge and the lower bridge cooperate to span a distance between the first road segment and the second road segment, thus providing a road surface between the first road segment and the second road segment;
    wherein, as a vehicle travels from the first road segment and starts moving across the upper bridge, the upper bridge will rotate downward about the pivot axis and will continue to rotate until the one or more upwardly extending segments of the lower bridge extend through the respective openings defined by the upper bridge, at which time the vehicle will transition from driving on the road surface as defined by the upper bridge to driving on the road surface as defined by the upwardly extending segments of the lower bridge.

2. The roadway arrangement as recited in claim 1, and further comprising a means for converting movement of the upper bridge into electric power.

3. The roadway arrangement as recited in claim 2, wherein the means for converting movement of the upper bridge into electric power includes a rod that is secured to an end of the upper bridge, a magnet secured to a distal end of the rod, and a coil, such that movement of the magnet relative to the coil generates a voltage.

4. The roadway arrangement as recited in claim 2, wherein the means for converting movement of the upper bridge into electric power includes a linkage pivotally secured at one end to an end of the upper bridge and pivotally secured at an opposite end to a wheel, such that, as the upper bridge moves up and down, the linkage drives the wheel for electric power generation.

5. The roadway arrangement as recited in claim 1, in which the first road segment is collectively formed by an existing road segment and a plate that extends from an edge of the existing road segment.

6. The roadway arrangement as recited in claim 1, in which the upper bridge is mounted to and extends from a drum which rotates about the pivot axis.

7. The roadway arrangement as recited in claim 6, and further comprising a counterweight mounted to the drum.

8. The roadway arrangement as recited in claim 1, in which each of the plurality of openings is an elongated slot with a longitudinal axis that is perpendicular to a direction of travel for vehicles traveling over the road surface.

9. The roadway arrangement as recited in claim 1, and further comprising one or more shock absorption elements arrayed around a portion of the periphery of the lower bridge that act to return the upper bridge to a static position.

10. A roadway arrangement, comprising:
a first road segment;
an upper bridge mounted for rotational movement about a pivot axis relative to the first road segment, said upper bridge defining a plurality of openings therethrough;
a lower bridge, including one or more upwardly extending segments, each of which is configured to pass through a respective opening defined by the upper bridge;
a second road segment, wherein the upper bridge and the lower bridge cooperate to span a distance between the first road segment and the second road segment, thus providing a road surface between the first road segment and the second road segment; and
a means for converting work produced by the rotational movement of the upper bridge about the pivot axis into electric power.

11. The roadway arrangement as recited in claim 10, wherein, as a vehicle travels from the first road segment and starts moving across the upper bridge, the upper bridge will rotate downward about the pivot axis and will continue to rotate until the one or more upwardly extending segments of the lower bridge extend through the respective openings defined by the upper bridge, at which time the vehicle will transition from driving on the road surface as defined by the upper bridge to driving on the road surface as defined by the upwardly extending segments of the lower bridge.

* * * * *